Jan. 2, 1962 C. H. CHRISTENSON 3,015,460
AIRCRAFT YAW CONTROL
Filed Jan. 27, 1960 2 Sheets-Sheet 1
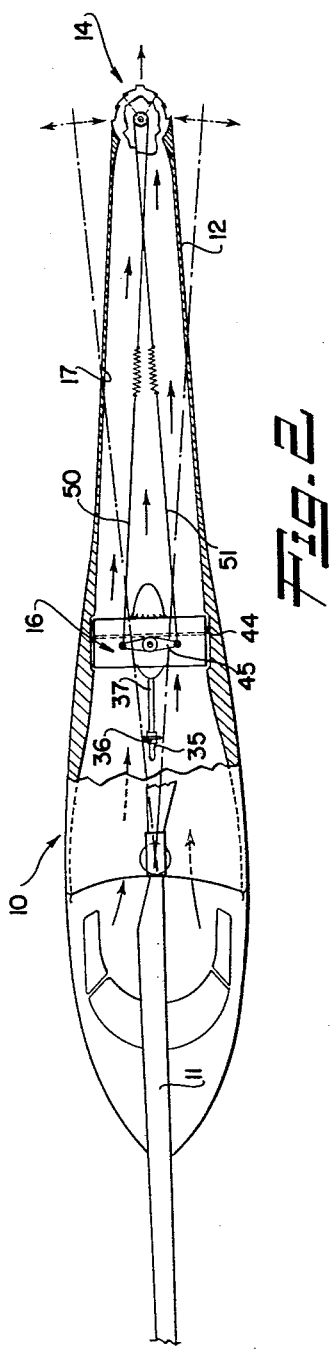
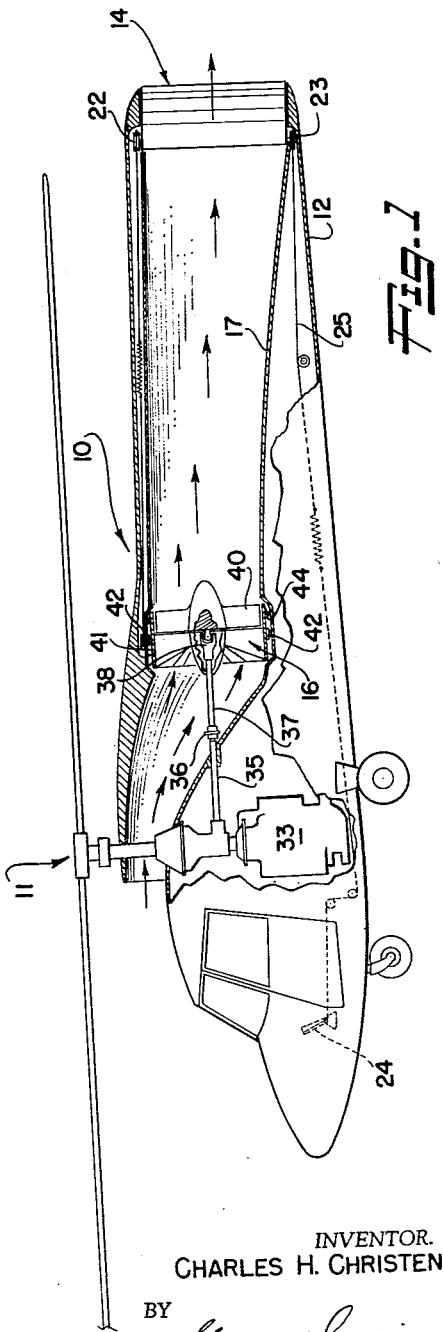
INVENTOR.
CHARLES H. CHRISTENSON
BY George C. Sullivan
Agent

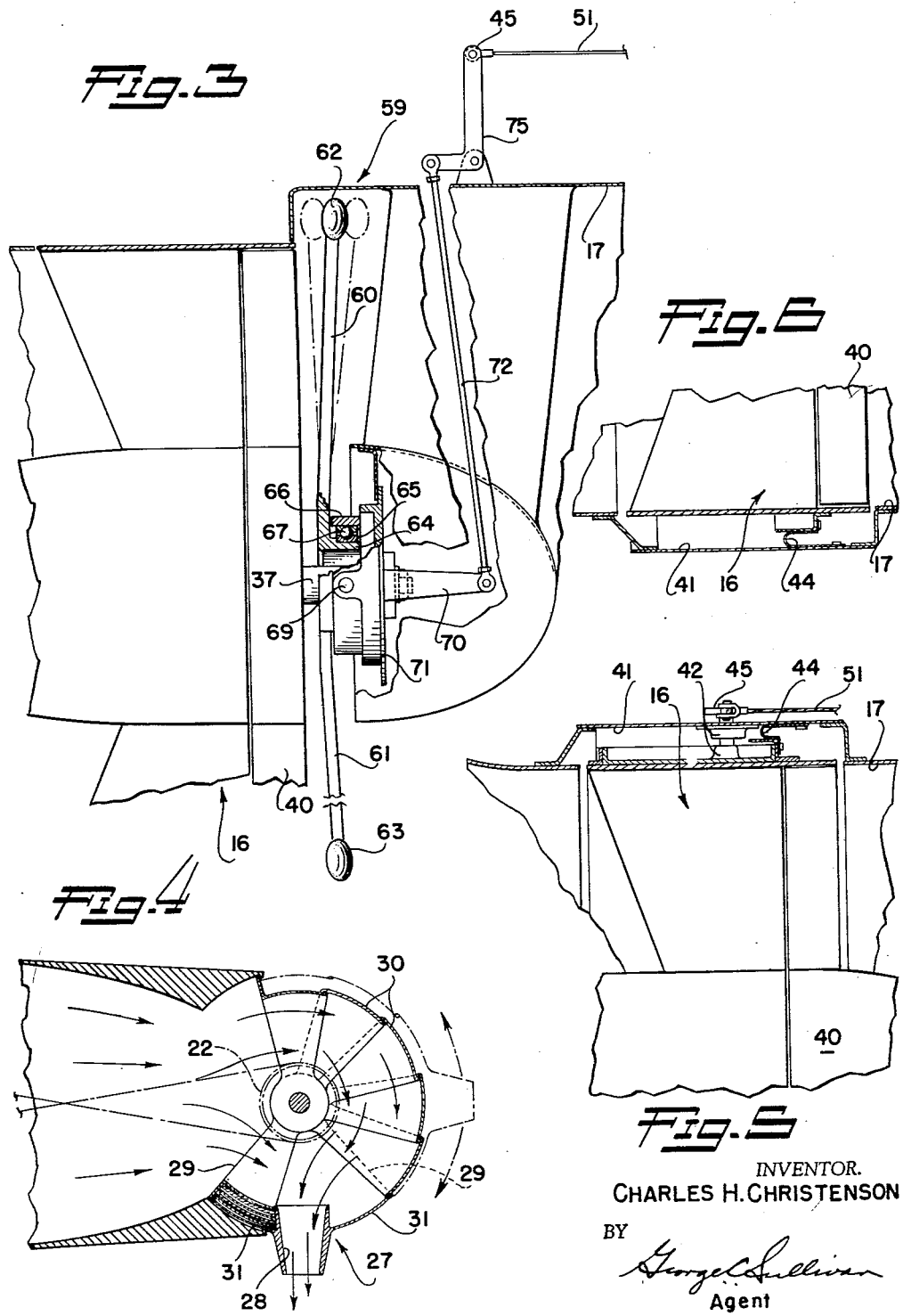

United States Patent Office 3,015,460
Patented Jan. 2, 1962

3,015,460
AIRCRAFT YAW CONTROL
Charles H. Christenson, Burbank, Calif., assignor to Lockheed Aircraft Corporation, Burbank, Calif.
Filed Jan. 27, 1960, Ser. No. 4,958
5 Claims. (Cl. 244—79)

The present invention relates to directional control means for an aircraft. More particularly, it relates to directional or yaw control means which utilizes a jet of high velocity air which may be directed to control the direction of the aircraft. More particularly, it relates to automatic yaw damping means to counteract undesired yawing.

Direction control means are mandatory in any aircraft. In a conventional aircraft, this is usually a rudder which is rotated about a vertical axis at one end or the other of the craft to change its direction of lift to move or rotate the aircraft about its vertical axis. In a helicopter type aircraft, direction control means usually involve a tail rotor incorporating pitch changing means which may be controlled by the pilot so that its thrust may be directed left or right, thus causing a change in heading of the helicopter.

In all types of craft that fly through the air, it is desirable to have means which will counteract undesired yaw movements resulting from devious gustiness of the air. If the operator of the aircraft were responsible to correct devious yaw movements, his attention would be diverted away from other duties important to the control and navigation of the aircraft. Even if he could devote complete attention to correction of devious yaw movements, it is probable that the reaction time interval between his sensing of the tendency and correction would not be sufficient. Therefore, some automatic yaw damping means is desirable.

Various means of automatic control have been attempted but the most important and the one found to be most practical in use is that which includes gyroscopic means. This involves a rotating mass which will tend to retain its plane of rotation in space. It is freely gimballed or pivoted so that if an aircraft is rotated about its vertical axis, a gyro element rotating on a horizontal axis tending to retain its spacial relationship will find itself in a new angular relationship with the aircraft. This angular relationship may be sensed and through various force amplifying means, may control either the rudder in the conventional aircraft or the pitch of the tail rotor of a helicopter to correct the craft to its directional heading. The force amplifying means is usually a series of electronic amplifiers and hydraulic servo mechanisms or electric motors. An autopilot is an example of this system.

The autopilot has been found quite effective. However, it is complex. Complexity multiplies cost and increases the possibility of malfunction. There is a tendency toward unreliability due to the number of elements involved and the various forms of transducing of the force which must occur in order to achieve the desired result.

The yaw control tail rotor of a helicopter involves a complex pitch mechanism. The drive members are susceptible to various problems not the least of which is vibration. The tail rotor involves fast moving parts located at the end of a long boom. Because of these moving parts, adequate clearance from surrounding objects must be allowed in operations near the ground. This increases the size requirements of heliports and restricts the number of areas of operation. Another restrictive disadvantage to use of tail rotors is the noise and vibration factor from both the rotor itself and the drive mechanism.

It is an important object of the present invention to provide aircraft yaw control means which avoids the disadvantages of fast moving exterior parts having a high noise factor. A directable jet of air is utilized to control direction.

It is another important object of the present invention to provide automatic yaw damping means which do not involve complex gyroscopic devices requiring electro-hydraulic-mechanical force amplifying means. A turbo compressor or means driven by it are utilized to provide a source of high velocity air to attain the previously named object. The rotational mass of the turbo compressor is utilized as a gyro to which the nozzle controlling the jet is directly connected.

Further objects and advantages of the present invention will become apparent from the reading of the following specification when taken in conjunction with the appended drawings wherein like numerals indicate like elements.

FIG. 1 is a side view of the present invention as shown used on a helicopter.
FIG. 2 is a plan view of FIG. 1.
FIG. 3 is a modification of the gyro to control yaw damping means.
FIG. 4 is a detail view of the tail boom nozzle.
FIG. 5 is a side view of the turbine compressor with parts broken away.
FIG. 6 is a top view of the turbine compressor with parts broken away.

In the present invention, a positive yaw control is provided by the reaction from a volume of high velocity air is jetted at the aft end of the aircraft in a direction opposite to the desired movement of the tail. To provide a source of high velocity air for positive yaw control, a turbine compressor is used. The turbine compressor involves a rotating mass which will tend to maintain its plane of rotation in space as does a gyroscope. This gyroscopic effect may be utilized to provide control forces if the turbine is gimballed or pivoted so that this tendency is permitted to a limited extent. By then providing some means by which a change in angular relation between the aircraft and the gimballed turbine may either be measured or directly applied mechanically to the positive yaw control means, yaw damping is achieved without necessity of additional autopilot parts. Since the turbine involves a relatively large mass as compared to the usual gyroscope for automatic control, there is no requirement for force amplifying means.

In order that movements in one plane be detected, a gyroscope must be mounted in a cage for rotation in the other plane and gimballed or pivoted at 90 degrees to its rotational axis. That is, if deviations in a horizontal plane are to be detected, the gyro must rotate in a vertical plane (on a horizontal axis). Such is the case with an aircraft where directional control is under consideration. Thus the turbine providing the rotational mass for yaw control, if used as a gyro for damping of the yaw, must rotate on a horizontal axis. If the axis of rotation of the turbine is parallel to the longitudinal axis of the aircraft, the gimbal axis may either be vertical or horizontal (but at 90 degrees to the rotational axis). If the gimbal axis is vertical, the aircraft in yaw will tend to move angularly away from the rotational plane of the turbine. If the gimbal axis is horizontal, yaw will cause a force on one end of that axis which will cause precession. The force of the yaw which causes a change in angular relationship between the rotational plane of the turbine and the aircraft may be utilized to operate the yaw control means to cause return to desired direction.

The invention is shown and described as part of a helicopter. It will be understood that the concept is not restricted to helicopters but is adapted for use on any aircraft. It is illustrated on the helicopter since yaw control is more delicate on that aircraft.

The helicopter 10 is equipped with the usual rotor 11 and the tail boom 12. Tail boom 12 has at its aft end a yaw control member 14 which is supplied with high velocity air from the turbine 16. The air from turbine 16 is ducted through duct 17. The high velocity air then passes through the yaw control member 14 in the manner shown in FIG. 2.

Yaw control member 14 is shown as embodying a series of collapsible elements 30 which extend from the top of the tail boom to the lower edge of the tail boom which fold one on top of the other as the nozzle 27 moves in either direction. Nozzle 27 is comprised of a spout 28 fixed to skirts 31 and segments 29. Segments 29 are pivoted at the top and bottom of the boom 12 with pulleys 22 and 23 fixed thereto.

Directional control is afforded to the pilot through the rudder pedals 24, the cables 25, the pulley 23 which will permit 180 degree movement of the nozzle 27 as can be seen from FIG. 2.

The compressor 16 is driven by a shaft 35, flexible coupling 36 and shaft 37 from the engine 33 through a power take-off mechanism. Shaft 37 is connected to fan 40 through a universal joint 38. The fan 40 is rotated within a shroud 41 which is pivoted for movement about a vertical axis in bearings 42. Shroud 41 is made comparatively air-tight with the duct 17 by means of a flexible fabric seal 44 about the shroud. Fixed to the top of shroud 41 is a cross arm 45. Attached to the ends of cross arm 45 are cables 50 and 51 which are fixed to the pulley 22. Cables 50 and 51 are crossed so that clockwise movement of the cross arm 45 as viewed in FIG. 2 will cause counterclockwise motion of the segment 29 of the nozzle 27.

The turbine-compressor 16 is a rotating body which will tend to maintain its plane of rotation in space. Therefore, when the boom 12 moves about the vertical axis of the helicopter, it also moves substantially about the gimbal axis of the turbine. When the boom moves in a clockwise direction as viewed in FIG. 2 the compressor 16 would move relatively counterclockwise. This relative movement will cause cable 50 to move forward and cable 51 to move aft. This would cause clockwise movement of the pulley 22 and the segment 29. Thus, the nozzle 27 would be moved toward the position shown in FIG. 2. The high velocity air would be ducted to the left side of the helicopter tending to move it counterclockwise to return it to its original axis. Conversely, a counterclockwise motion of the boom 12 would cause an angular relationship with the compressor 16 so that there would be a pulling effect on cable 51, producing a counterclockwise motion of the nozzle 27 to bring the boom 12 back to its original direction.

During most conditions of flight of a helicopter, the rotor, if rotating in a counterclockwise direction as viewed in FIG. 2, will cause a clockwise torque to boom 12. Therefore, the nozzle 27 will generally be pointed to the left side to counteract this built-in torque.

Where it is found not practical to use a gimballed compressor, a separate gyro element may be used which is driven by the compressor shaft. It would have to have a universal connection to permit it to rotate in any plane within restricted limits. Gyro 59 is shown in FIG. 3 as having a pair of arms 60 and 61 fixed to hub 64 which have weights 62 and 63 on their ends to present a rotating mass. Hub 64 is connected to drive shaft 37 extending through fan 40 by any universal connection. The hub 64 is fixed to inner race 65 of a ball bearing member having an outer race 66 with ball bearings 67 therebetween. The outer race 66 is pivoted on a gimbal axis 69 which is transverse to the body of the boom 12. Since gyro 59 is gimballed on a horizontal axis, yaw movements will exert a force on one end or the other of the gimbal axis 69 resulting in precession. The plane of rotation of gyro 59 will precess from vertical to fore or aft inclination as shown by the dotted lines. This precession force is utilized through appropriate linkages to move yaw control member 14 in the manner previously described.

Arm 70 is fixed to the outer race 66 by means of the plate 71. Arm 70 is pivoted to link 72 so that movement of arm 70 about gimbal axis 69 will cause up and down movement of link 72. Link 72 is pivoted to bell crank 75 so that its up and down movement will cause fore and aft movement of one end of arm 45 to which it is pivoted. Movement of arm 45 will cause the requisite movement of cables 50 and 51 for yaw correction at member 14. The end of the cross arm 45 to which the bell crank 75 will be pivoted will be determined by the direction of rotation of the gyro 59.

It will be seen that the gyro mechanism, as shown in FIG. 3 may be pivoted on a vertical axis with the appropriate change in linkage to effect the necessary movement to the cables 50 and 51 and the yaw control member 14 as is the turbo compressor 16 as shown in FIGS. 1 and 2. By the same reasoning, the turbo compressor 16 may be pivoted on a horizontal axis with appropriate linkages to cables 50 and 51 to effect the necessary movement of member 14 to correct for the yaw.

While the invention has been described in conjunction with a helicopter, it will be understood that its use is not restricted to rotary wing aircraft but may be used on any aircraft.

The invention has been shown for purposes of example as a yaw control means. It will be apparent to those skilled in the art that pitch control may be attained by changing the plane of rotation of the gyro (turbine) to horizontal (about a vertical axis) and gimballing it on an axis 90 degrees to the axis of rotation and ducting the high velocity air from the turbine to a nozzle pivoted on a horizontal axis.

It is to be understood that certain alterations, modifications and substitutions may be made to the instant disclosure without departing from the spirit and scope of the invention as described in the appended claims.

Having thus revealed the operative details of my invention, I claim the following combinations and equivalents thereof for which I desire the protection of a United States Letters Patent.

What is claimed is:

1. In an aircraft, control means comprised of a rotary compressor to provide a source of high velocity air, gimbal means for said rotary compressor on an axis 90 degrees from a horizontal axis of said aircraft, nozzle means at an extremity of said aircraft, means to conduct said high velocity air through said nozzle means, means to permit rotation of said nozzle means about at least one axis, means fixed to move with said rotary compressor at said gimbal means axis, means to connect said least named means to said nozzle means so that movement of said aircraft with respect to said rotary compressor as permitted by said gimbal means will cause said nozzle means to be directed in the direction of said movement to counteract said movement.

2. In an aircraft, yaw control means comprised of a rotary compressor to provide a source of high velocity air, said rotary compressor being mounted for rotation on a horizontal axis, gimbal means for said rotary compressor on an axis 90 degrees from said horizontal axis, nozzle means at an extremity of said aircraft, means to conduct said high velocity air through said nozzle means, means to permit at least partial rotation of the nozzle means about a substantially vertical axis, means fixed to move with said rotary compressor at said gimbal means axis, means to connect said last named means to said nozzle means so that movement of said aircraft with respect to said rotary compressor as permitted by said gimbal means will cause said nozzle means to be directed in the direction of said movement to counteract said movement.

3. In an aircraft, yaw control means comprised of a rotary compressor to provide a source of high velocity air, said rotary compressor being mounted for rotation on a high horizontal axis, gimbal means for said rotary compressor on a vertical axis, nozzle means at an extremity of said aircraft, duct means to conduct said high velocity air through said nozzle means, means to permit at least partial rotation of said nozzle means about a substantially vertical axis, means fixed to said rotary compressor to move with it about said gimbal means axis, means to connect said last named means to said nozzle means so that movement of said aircraft with respect to said rotary compressor as permitted by said gimbal means as will cause said nozzle means to be directed in the direction of said movement to counteract said movement.

4. Yaw control means in an aircraft having a longitudinal axis duct means substantially along the longitudinal axis terminating at the aft of the aircraft, an air scoop at the forward end of the duct, rotary means in said duct to accelerate air taken at the scoop through the duct to the aft end of the craft, said rotary means rotating on an axis parallel to the longitudinal axis, drive means for the rotary means, universal means between the drive means and the rotary means, vertical gimbal means to permit oscillation of said rotary means about the axis formed by the vertical gimbal means, a nozzle at the aft end of the duct, a vertical axis for the nozzle, means fixed to move with said rotary means at said gimbal means axis, means to connect said last named means to said nozzle means so that movement of said aircraft with respect to said rotary means as permitted by said gimbal means will cause said nozzle to be directed in the direction of said movement to counteract said movement.

5. Yaw control means for an aircraft having a longitudinal axis, a duct along the longitudinal axis of the aircraft terminating at the aft end of the aircraft, a scoop at the forward end of the duct for taking in air from the front of the aircraft, a rotary compressor in said duct intermediate its ends, means to drive said rotary compressor, universal connection means between the means to drive and the rotary compressor, a shroud around said rotary compressor, said shroud being mounted in a vertical axis, a laterally extending horn fixed to said shroud, a nozzle at the aft end of the duct, a vertical axis for the nozzle, pulley means fixed to the nozzle, cable means between the horn and the pulley means attached in such a manner that movement of said aircraft with respect to said rotary compressor as permitted by the vertical axis for the shroud will cause the nozzle to be directed in the direction of said movement to counteract said movement.

References Cited in the file of this patent

UNITED STATES PATENTS

| 2,518,697 | Lee | Aug. 15, 1950 |
| 2,552,359 | Winslow | May 8, 1951 |

FOREIGN PATENTS

| 883,462 | France | Mar. 22, 1943 |